United States Patent
Hartmann et al.

(10) Patent No.: US 9,101,940 B2
(45) Date of Patent: Aug. 11, 2015

(54) METHOD FOR SEPARATING MAGNETISABLE PARTICLES FROM A SUSPENSION AND ASSOCIATED DEVICE

(75) Inventors: Werner Hartmann, Weisendorf (DE); Wolfgang Krieglstein, Nürnberg (DE)

(73) Assignees: SIEMENS AKTIENGESELLSCHAFT, Munich (DE); BASF SE, Ludwigshafen (DE)

( * ) Notice: Subject to any disclaimer, the term of this patent is extended or adjusted under 35 U.S.C. 154(b) by 791 days.

(21) Appl. No.: 13/387,807

(22) PCT Filed: Jul. 23, 2010

(86) PCT No.: PCT/EP2010/060683
§ 371 (c)(1),
(2), (4) Date: Jan. 30, 2012

(87) PCT Pub. No.: WO2011/012539
PCT Pub. Date: Feb. 3, 2011

(65) Prior Publication Data
US 2012/0125858 A1  May 24, 2012

(30) Foreign Application Priority Data
Jul. 31, 2009 (DE) .......................... 10 2009 035 416

(51) Int. Cl.
*B03C 1/033* (2006.01)
*B01D 21/30* (2006.01)
(Continued)

(52) U.S. Cl.
CPC ................ *B03C 1/288* (2013.01); *B01D 21/30* (2013.01); *B01D 35/06* (2013.01); *B03C 1/0335* (2013.01); *B03C 2201/18* (2013.01)

(58) Field of Classification Search
CPC .. B03C 1/288; B03C 1/0335; B03C 2201/18; B01D 21/30; B01D 35/06
USPC ........... 210/695, 739, 806, 97, 143, 223, 243; 209/232; 204/555, 661
See application file for complete search history.

(56) References Cited

U.S. PATENT DOCUMENTS

| | | |
|---|---|---|
| 1,043,851 A | 11/1912 | Lockwood |
| 4,293,410 A | 10/1981 | Streuli et al. .................. 210/107 |

(Continued)

FOREIGN PATENT DOCUMENTS

| | | | |
|---|---|---|---|
| DE | 2922612 A1 | 12/1980 | ................ B03C 1/22 |
| EP | 0252190 A1 | 1/1988 | ................ B03C 1/28 |

(Continued)

OTHER PUBLICATIONS

International Preliminary Report on Patentability, PCT/EP2010/060683, 6 pages, Nov. 4, 2011.

(Continued)

*Primary Examiner* — David A Reifsynder
(74) *Attorney, Agent, or Firm* — Slayden Grubert Beard PLLC

(57) ABSTRACT

In a method for separating magnetizable particles from a suspension, the suspension is passed through a cylinder-symmetrical separator wherein the substance streams are separated by at least one tubular separation screen. The separator separates the substance stream into a concentrate as well as a so-called tailing and the control of the separation rate of the concentrate and tailing is carried out solely by controlling the flow rate. To this end, at least one separation screen (11, 21) is displaceable in the separator (10, 20), so that a variable gap (15, 25) is formed.

18 Claims, 2 Drawing Sheets

(51) Int. Cl.
*B01D 35/06* (2006.01)
*B03C 1/28* (2006.01)

(56) References Cited

U.S. PATENT DOCUMENTS

| | | | |
|---|---|---|---|
| 4,902,428 A | 2/1990 | Cohen | 210/695 |
| 7,429,331 B2 | 9/2008 | Lumsden et al. | 210/695 |
| 2002/0157992 A1 | 10/2002 | McGaa | 209/39 |
| 2005/0035030 A1 | 2/2005 | Oder et al. | 209/232 |
| 2008/0035541 A1 | 2/2008 | Franzreb et al. | 210/137 |

FOREIGN PATENT DOCUMENTS

| | | | |
|---|---|---|---|
| GB | 462912 | 3/1937 | |
| GB | 1139581 A | 1/1969 | B01D 1/28 |
| JP | 63296886 A | 12/1988 | B03C 1/28 |
| RU | 2288781 C2 | 12/2006 | B03C 1/00 |
| SU | 1166828 A1 | 7/1985 | B03C 1/16 |
| SU | 1794890 A1 | 2/1993 | C02F 1/48 |

OTHER PUBLICATIONS

Australian Office Action, Application No. 2010277737, 3 pages, Mar. 7, 2014.

though the diameter of the separating screen generally cannot be changed, so the ratio of the concentrate-tailing flow rates can similarly only be influenced through control of the mass flow rate. It is therefore necessary to disclose a separating screen construction by means of which the ratio of the volume flow rates is easily and reliably controlled as a function of corresponding control variables so that the overall process always executes in an optimal manner.

SUMMARY

According to various embodiments an improved method can be proposed and suitable devices for separating material flows containing magnetizable particles can be created.

According to an embodiment, in a method for separating magnetizable particles from a suspension that is present in the form of a material flow and contains metallic and non-metallic fractions and has a predefined mass flow rate, the magnetizable material fractions are separated from the non-magnetizable material fractions by means of electromagnetic fields and the material flow is converted into a valuable material concentrate on the one hand and what is known as tailing on the other hand, the concentrate/tailing separation rate is influenced solely by influencing the mass flow rate of the material flow, and the mass flow rate of the material flow is predefined and/or varied by mechanically adjusting a flow gap in order to achieve a predefined concentrate/tailing separation rate.

According to a further embodiment, the concentrate/tailing ratio can be independent of the control of the mass flow rate of the material flow of the suspension. According to a further embodiment, the overall concentrate/tailing separation process may execute automatically independently of the ratio of the volume streams. According to a further embodiment, the metallic components of the suspension may contain non-magnetizable particles as valuable material and magnetizable particles as auxiliary material which in bound form are subjected to magnetic separation. According to a further embodiment, the non-magnetizable valuable material can be copper and magnetite can be used as the magnetizable auxiliary material. According to a further embodiment, the valuable material stream may have a valuable material concentration of greater than 50%. According to a further embodiment, the valuable material concentration can be >75%. According to a further embodiment, the material flows can be subjected to a plurality of magnetic separations. According to a further embodiment, the material flow of the at least one further magnetic separation can be added to the output stream. According to a further embodiment, the tailing stream of the at least one magnetic separation can be subjected to a further magnetic separation.

According to another embodiment, a device for carrying out the method as described above may comprise a longitudinally symmetrical magnetic separator which for separation of the material flows has at least one separating gap which has a variable gap width, wherein an at least partially tubular separating screen is provided for adjusting the separating gap, the at least one separating screen being adjustable in the circumferential direction of the longitudinally symmetrical separator.

According to a further embodiment of the device, the separating screen can be segmented, two segments at least partially overlapping in pairs in each case. According to a further embodiment of the device, the separating screen can be axially displaceable. According to a further embodiment of the device, the separator can be cylindrically symmetrical and has a circular cross-section. According to a further embodiment of the device, the individual segments can be moved by means of connecting link-like, circular segment-shaped guides which form acentric control cams. According to a further embodiment of the device, an approximately closed external contour can be always achieved during the movement of the acentric control cams. According to a further embodiment of the device, in the cylindrically symmetrical separator the space between the external contour and the separator inner wall may form a separating gap which is variable in width and which can be used as a wedge-shaped screen for varying the concentrate stream independently of other method parameters. According to a further embodiment of the device, the wedge-shaped separating screen can be arranged so as to be displaceable in the cylindrically symmetrical separator, such that a larger or smaller separating gap forms for separating the concentrate depending on the position of the screen. According to a further embodiment of the device, the wedge-shaped separating screen can be arranged so as to be displaceable in the flow direction or against the flow direction. According to a further embodiment of the device, the incline of the wedge-shaped separating screen may face toward the inner wall of the cylindrically symmetrical separator.

BRIEF DESCRIPTION OF THE DRAWINGS

Further details and advantages will emerge from the following figure-related description of exemplary embodiments with reference to the drawing and in conjunction with the claims.

In the figures, in each case in a schematic view.

DETAILED DESCRIPTION

According to various embodiments, it is proposed to use, in particular in a tubular or tubular gap-shaped arrangement, a separating screen which is segmented in the circumferential direction and in which segments partially overlap in pairs in each case, the individual segments being moved on circular, acentric control cams in such a way that an approximately closed external contour is always achieved. In this case the space between said external contour and the separator inner wall forms a separating gap which can be varied in width and with the aid of which the concentrate stream can be changed independently of other method parameters.

Alternatively a wedge-shaped separating screen can be arranged in a corresponding separator so as to be displaceable in or against the flow direction, such that a larger or smaller separating gap forms for separating the concentrate depending on the position of the screen. The incline of the separating wedge faces toward the inner wall of the separator, such that the gap located therebetween at the end of the separator can be enlarged or reduced by way of this axial displacement. This may be implemented in all conceivable flow cross-sections, in rectangular gaps and in rotationally symmetrical arrangements or in tubes with a non-circular cross-section.

The following advantages result from the various embodiments:
- a continuous edge is produced by the annular, nested tubular segments, which may, for example, be circular segment control cams,
- the control cams are controlled by way of a common cam disk, thereby producing an approximately closed external contour,
- the external radius matches the internal radius of the separator gap,
- the edges of the segments can be provided with hard metal, hard ceramic or another form of wear protection against abrasion due to the mineral solid fraction of the pulp, and this is also possible with an axially displaced, one-piece separating screen,
- alternatively a separating screen which is conically shaped toward the magnet-side surface of the separating gap can be axially displaced in order thereby to enlarge or reduce the separating gap in a particularly easy manner,
- the separator gap width can be adjusted by way of electromechanical actuating elements which are controlled by an electronic controller. As a control variable the electronic controller receives a signal which can be obtained from the magnetite quantity contained in the partial streams or the output mass stream relating to the volume-based magnetizability thereof.

Figure 1:
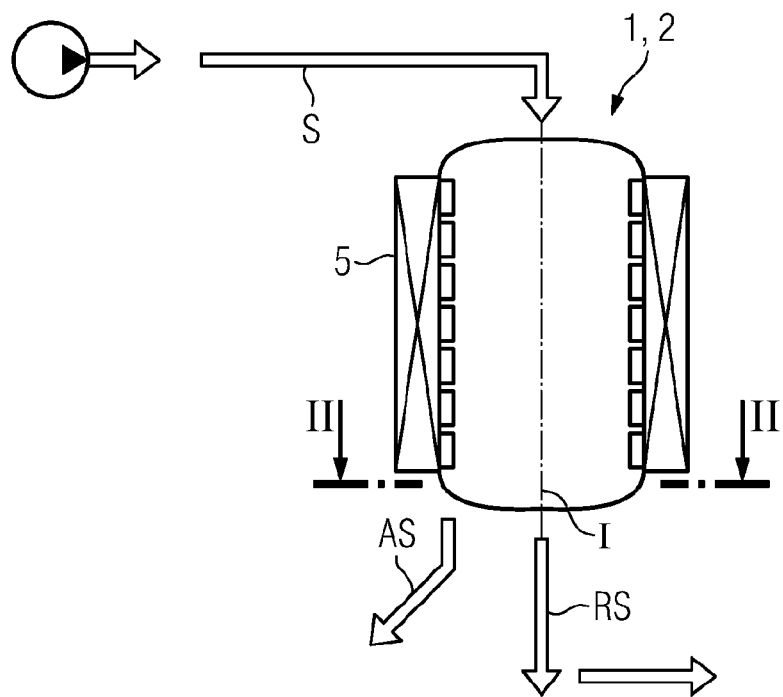
FIG. 1 shows a magnetic separator.

In FIG. 1 reference numeral 1 designates a separator which is symmetrical to a longitudinal axis I. The separator preferably has a round cross-section, although it may also have a rectangular or square cross-section. Located on the separator 1 is a magnetic device which in practice is formed by a coil as an electromagnet for electrically activatable magnetization. Other mechanical magnetic devices are also possible.

A material flow S which consists of an ore with magnetizable particles and other substances is conveyed into the separator by means of a pump or the like. The material flow is to be separated into a valuable material concentrate and a residual gangue (tailing).

In the prior art a material flow is separated in practice into a valuable material concentrate and a residual gangue predominantly according to what is known as the floating principle, wherein the different substances are separated by means of flowing liquids. If magnetic separation is to be performed, it must be ensured that the metallic particles of the crude ore are rendered magnetizable following grinding to particles of less than 1 µm. In the case of copper ores, in which the metallic part is bound in particular as copper sulfide, this can be achieved in that magnetizable iron ore components, in particular in the form of magnetite ($Fe_2O_3$), accumulate on the copper sulfide particles. Reference is made specifically in this regard to the relevant patent applications of the applicant.

Figure 2:
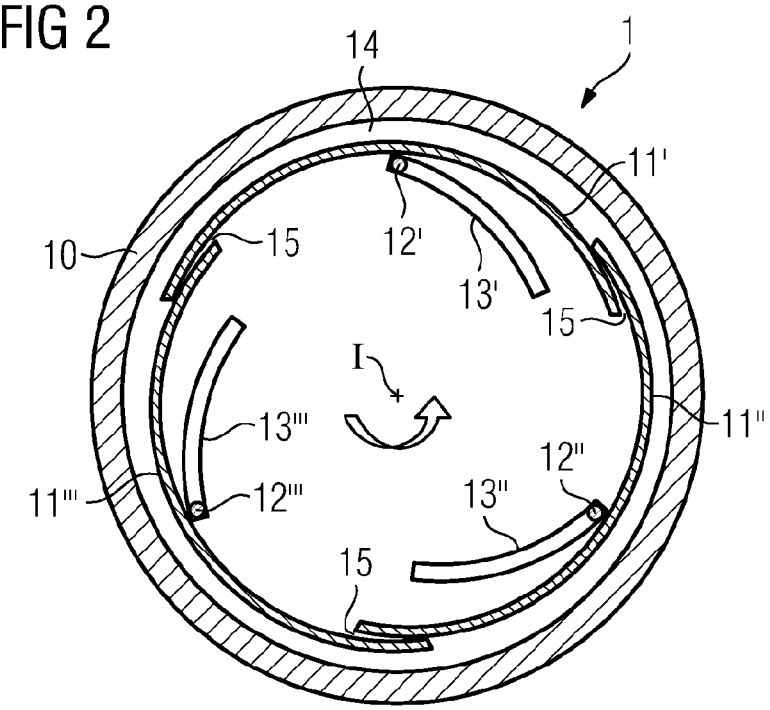
FIG. 2 shows the cross-section of a magnetic separator with azimuthally adjustable screens.

In FIG. 2 reference numeral 10 designates the tube wall of the separator 1 from FIG. 1. The section is made in the lower region of the separator 1. It can be seen that a separating screen 11 is present which consists of three part-screens 11', 11'', 11''' which overlap around the circumference. The part-screens 11', 11'', 11''' can each be pivoted about a guide axis 12', 12'', 12''' which are in turn each guided in a connecting link 12 as an acentric guide cam. A gap 15 is formed between the separating part-screens 11', 11'', 11''' in each case. The width of the gap 15 can be varied externally and adjusted to the particular requirements in particular by way of an electric controller.

The fraction of the material flow discharged as valuable material concentrate can therefore be influenced by the current width of the gap 15. The residual gangue, what is referred to as the tailing, is discharged in the central part.

In the case of a cylindrically symmetrical construction of the separator according to FIG. 2, a displacer (which is not shown specifically in FIG. 2) may be present in order to improve efficiency. Separation of the material flow into valuable material and tailing is improved thereby.

Figure 3:
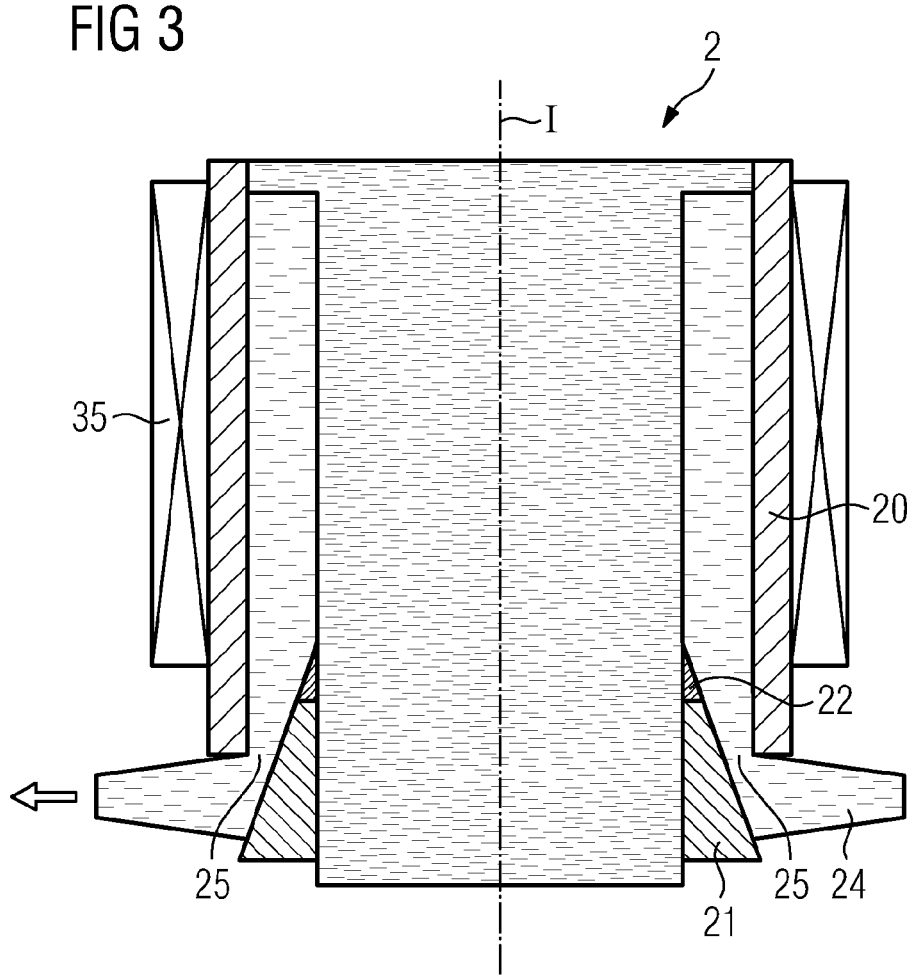
FIG. 3 shows a longitudinal section through a separator according to FIG. 1 with an axially adjustable screen device.

In FIG. 3 a tube wall of the separator 1/2 from FIG. 1 is designated by reference numeral 20. The longitudinal section in the lower region is shown here. In this embodiment variant a screen device 21 is arranged therein so as to be axially displaceable, a gap 25 being produced between screen 21 and tube inner wall 20 of the separator 2. The screen device is embodied therein in such a way that the circumferential gap 25 is changed with the axial displacement. The fraction of the material flow is again channeled out at the circumference thereby and a variable value flow created.

In FIG. 3 a wear protection mechanism 22 is arranged on the surface of the separating screen 21. A coil 35 can also be seen here as part of the magnetic device 5 from FIG. 1 with which suitable magnetic fields can be produced for the intended purpose.

It can be shown that with appropriate conditioning of the material flow by means of the magnetic activation the magnetizable particles are enriched at the circumference of the cylindrically symmetrical separator. Thus, efficient separation is possible by virtue of the magnetic activation. Separation rates of up to 85% can be achieved.

A further enrichment can be accomplished if the tailing passes through a further magnetic separating device. A cascade-like arrangement of magnetic separators according to FIG. 2 or FIG. 3 is also possible.

What is claimed is:

1. A device for separating magnetizable particles from a suspension in a material flow and contains metallic and non-metallic fractions and has a predefined mass flow rate, the device comprising:
   a longitudinally symmetrical magnetic separator comprising a magnetic device for producing magnetic fields for separation of the material flow into multiple constituents, and
   a separating screen that is at least partially tubular in shape and arranged within the longitudinally symmetrical magnetic separator, the separating screen separating an interior area radially inside the separating screen from an exterior area radially outside the separating screen, the exterior area defining a separating gap between the separating screen and an inner wall of the longitudinally symmetrical magnetic separator,
   the separating screen being adjustable in a circumferential direction of the longitudinally symmetrical magnetic separator to thereby adjust a gap width of the separating gap, and
   electronic control elements configured for adjusting the separating screen to thereby adjust the gap width of the separating gap, which electronic control elements receive as a control variable a signal based on a magnetite quantity contained in parts of the material flow or in the material flow relating to the volume-based magnetizability thereof.

2. The device according to claim 1, wherein the separating screen is segmented into multiple segments that at least partially overlap each other.

3. The device according to claim 2, wherein the multiple segments are moved using acentric control cams.

4. The device according to claim 3, wherein the multiple segments of the separating screen cooperate to define an approximately closed external contour.

5. The device according to claim 1, wherein the separating screen is axially displaceable.

6. The device according to claim 1, wherein the longitudinally symmetrical magnetic separator is cylindrically symmetrical and has a circular cross-section.

7. The device according to claim 1, wherein separating screen has a wedge-shaped cross-section.

8. The device according to claim 7, wherein the separating screen having the wedge-shaped cross-section is longitudinally movable with respect to the longitudinally symmetrical magnetic separator.

9. The device according to claim 7, wherein the wedge-shaped cross-section of the separating screen defines an incline that faces toward the inner wall of the longitudinally symmetrical magnetic separator.

10. A method for separating magnetizable particles from a suspension in a material flow and contains metallic and non-metallic fractions and has a predefined mass flow rate, the method comprising:
    providing a separating screen that is at least partially tubular in shape and arranged within a longitudinally symmetrical magnetic separator for separation of the material flow, the separating screen separating an interior area radially inside the separating screen from an exterior area radially outside the separating screen, the exterior area defining a separating gap between the separating screen and an inner wall of the longitudinally symmetrical magnetic separator,
    adjusting the separating screen in a circumferential direction of the longitudinally symmetrical magnetic separator, to thereby adjust a gap width of the separating gap,
    using electronic control elements to adjust the separating screen to thereby adjust the gap width of the separating gap, which electronic control elements
    receiving as a control variable, at an electronic control system, a signal based on a magnetite quantity contained in parts of the material flow or in the material flow relating to the volume-based magnetizability thereof, and
    based on the received signal, the electronic control system adjusting the separating screen to thereby adjust the gap width of the separating gap, and
    using a magnetic device of the magnetic separator to separate the material flow.

11. The method according to claim 10, wherein the at least partially tubular separating screen is segmented into multiple segments that at least partially overlap each other.

12. The method according to claim 11, comprising moving the multiple segments using acentric control cams.

13. The method according to claim 12, wherein the multiple segments of the separating screen cooperate to define an approximately closed external contour.

14. The method according to claim 10, comprising the step of axially displacing the separating screen.

15. The method according to claim 10, wherein the longitudinally symmetrical magnetic separator is cylindrically symmetrical and has a circular cross-section.

16. The method according to claim 10, wherein separating screen has a wedge-shaped cross-section.

17. The method according to claim 16, comprising moving the separating screen having the wedge-shaped cross-section is longitudinally with respect to the longitudinally symmetrical magnetic separator.

18. The method according to claim 16, the wedge-shaped cross-section of the separating screen defines an incline that faces toward the inner wall of the longitudinally symmetrical magnetic separator.

* * * * *